Figure 1:
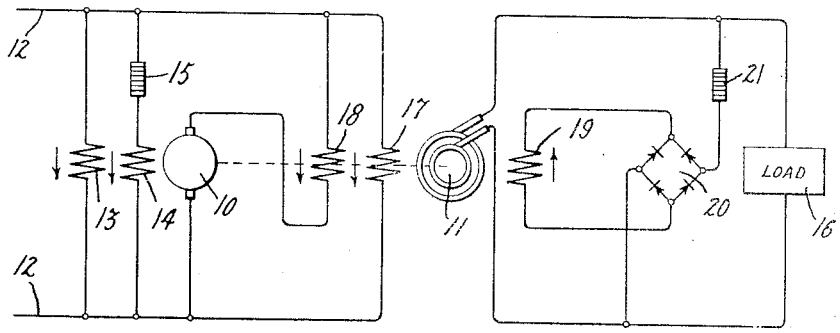

Sept. 29, 1942.  A. FISHER  2,297,350

DYNAMOELECTRIC APPARATUS

Filed Sept. 30, 1941

Inventor:
Alec Fisher,
by Harry E. Dunham
His Attorney.

Patented Sept. 29, 1942

2,297,350

UNITED STATES PATENT OFFICE 2,297,350

DYNAMOELECTRIC APPARATUS

Alec Fisher, Lynn, Mass., assignor to General Electric Company, a corporation of New York Application September 30, 1941, Serial No. 412,987

9 Claims. (Cl. 171—123)

My invention relates to dynamo-electric apparatus and more particularly to dynamo-electric apparatus for converting direct current to alternating current.

In many cases it is necessary to provide apparatus for converting electrical energy from a variable voltage direct current to an alternating current of substantially constant voltage and frequency. For example, in railway cars there is often installed alternating current load apparatus such as alternating current motors for driving refrigerating machines. The power supply available is generally a storage battery connected to be charged by an axle driven generator and the voltage of the direct current supply frequently varies as much as forty per cent from normal maximum value. Alternating current load devices are often supplied by dynamo-electric apparatus comprising an alternating current generator connected to be directly driven by a direct current motor energized from the railway car power supply. In order to prevent undesirable variations in the frequency of the alternating current supplied by the generator, regulating means must be provided to keep the direct current motor speed substantially constant despite relatively wide variations in the direct current supply voltage. Also, regulating means must be provided to keep the alternating current voltage substantially constant in order to obtain most efficient operation of the load apparatus.

It is an object of my invention to provide improved dynamo-electric apparatus for converting direct current to alternating current.

It is another object of my invention to provide dynamo-electric apparatus for converting direct current to alternating current having improved regulating means for maintaining the voltage and frequency of the alternating current substantially constant with variation in the voltage of the direct current supply.

A further object of my invention is to provide improved regulating means for direct current to alternating current converting apparatus which is simple and rugged in construction and has no moving parts.

A still further object of my invention is to provide an improved excitation system for two direct coupled dynamo-electric machines.

According to my invention I provide dynamo-electric apparatus for converting direct current to alternating current comprising a direct current motor and an alternating current generator connected to be driven thereby. In order to prevent variations in the speed of the direct current motor and corresponding variations in the frequency of the alternating current generator with variations in the direct current supply voltage, my invention may be embodied in various forms. Several embodiments are illustrated, by way of example, in which a direct current motor is provided with a shunt field having connected in series therewith a non-linear impedance element having a negative impedance-current characteristic. The non-linear impedance element acts to bring about a disproportionate change in the motor excitation with variations in supply voltage in such a manner that the motor speed is held substantially constant. In order automatically to adjust the excitation of the alternating current generator in accordance with variations in load thereon, I provide the generator with a field winding which is arranged to be energized in accordance with the current drawn by the direct current drive motor. Thus, when the load on the alternator increases, the torque and the load current of the direct current motor increases correspondingly to bring about a compensatory adjustment of the excitation of the alternator in a direction tending to maintain the generator output voltage at a normal value. A further means for automatically adjusting the voltage of the alternating current generator is provided in the form of a differential generator field winding whose energization is controlled in accordance with the voltage across the output terminals of the generator. A second non-linear impedance element having a negative impedance-current characteristic is connected in circuit with the differential field winding to increase its sensitivity of operation.

Figure 2:
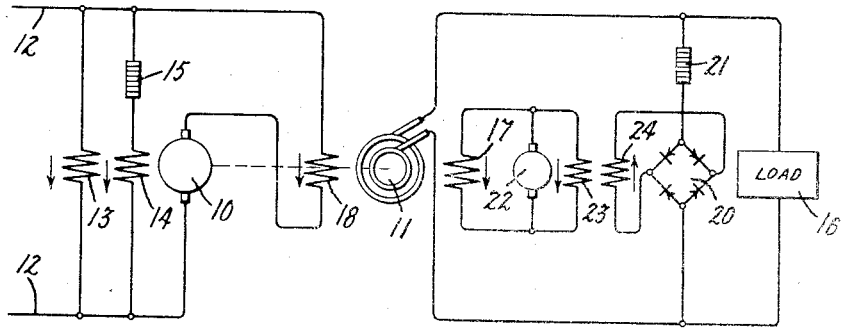

My invention will be better understood from the following description taken in connection with the accompanying drawing in which Fig. 1 represents in diagrammatic form one embodiment of my invention used to control the excitation of direct-coupled direct current and alternating current dynamo-electric machines, and Fig. 2 is a modification of the arrangement illustrated in Fig. 1.

Referring to Fig. 1 of the drawing, I have shown dynamo-electric apparatus for converting direct current into alternating current comprising a direct current motor 10 connected to drive an alternating current generator 11. The armature of the motor 10 is connected to be supplied from variable voltage direct current supply lines 12 such as, for example, the power supply lines of a railway car, and the motor has two cumulatively wound field windings 13 and 14 which are connected across the direct current supply lines 12. The motor field winding 14 has connected in series therewith a non-linear impedance element 15 having a negative impedance-current characteristic which will be described in greater detail below.

The output terminals of the alternating current generator 11 are connected to supply an alternating current load indicated generally at 16. The alternating current generator 11 has a main field winding 17 and two auxiliary field windings 18 and 19. The generator main field winding 17 is connected to be energized from any suitable direct current source and has been shown as being energized from the direct current supply lines 12. In accordance with my invention the field winding 18 produces a compensating effect on the excitation of the generator 11 and is energized in accordance with the load current drawn by the direct current drive motor 10. In the illustrated embodiment, this is accomplished by connecting the generator field winding 18 directly in series with the armature of the motor 10. The polarities of the generator field windings 17 and 18 are such that these windings are cumulative in their action.

The generator field winding 19 has an energizing circuit connected to the output terminals of the generator. In order that the field winding 19 may be supplied with direct current the energizing circuit includes a full wave rectifier 20 which may, for example, be the dry contact type. For the purpose of causing the energization of the field winding 19 to vary non-linearly with the alternator output voltage, the energizing circuit also includes a non-linear impedance element 21 having a negative impedance-current characteristic which is similar to the non-linear impedance element 15. The polarity of the winding 19 is opposite to the polarity of the windings 17 and 18, or, in other words, the winding 19 is differentially wound as compared with the other generator field windings 17 and 18.

As mentioned above, the non-linear impedance elements 15 and 21 have a negative impedance-current characteristic. By negative impedance-current characteristic, I mean an impedance whose ohmic value decreases with increase of current therethrough or voltage thereacross. Many such impedance devices are known in the art, for example, there are impedance devices of this character which operate through temperature changes. Thus certain forms of carbon and boron have negative temperature coefficients of resistance and increases in current through these elements raise their temperature and thus cause a reduction in their electrical resistance. Another form of non-linear impedance with a negative impedance-current characteristic that may be used as the element 21 is a saturable reactor. While my invention is not limited to any particular type of negative impedance-current characteristic impedance device, I at present prefer to use the special ceramic resistance material which is disclosed and claimed in Patent No. 1,822,742, granted September 8, 1931, on the application of K. B. McEachron and assigned to the assignee of the present application. This material has the property of substantially and instantaneously reducing its electrical resistance with increases in current through it or voltage across it and its resistance is substantially independent of temperature.

In operation, the excitation of the direct current drive motor 10 and the alternating current generator 11 is automatically regulated so that the frequency and voltage of the alternating current output circuit is maintained constant.

The operation of the regulating means for maintaining the speed of the direct current drive motor 10 and the frequency of the alternator 11 constant with variations in voltage across the direct current supply lines 12 will first be described. Let it be assumed that the voltage of the direct current supply line 12 is at some given value and the field windings 13 and 14 of the direct current motor are adjusted so that the speed of the motor and consequently the frequency of the alternator 11 is at the desired value. Now suppose the voltage of the direct current supply line falls to some lower value. Because there is some saturation in any D. C. motor of normal design and because the armature IR drop is not negligible, a decrease in the total exciting ampere turns of the motor merely proportional to the decrease in supply voltage would not maintain the speed unchanged and as a result the speed of the motor 10 would normally tend to decrease. The non-linear impedance element 15, however, increases its impedance with the decrease in voltage thereacross so that the excitation of the motor field winding 14 does not decrease proportionally to the decrease in direct current supply voltage and as a result the motor 10 tends to speed up and return to its normal value. Similarly, when the voltage of the D. C. supply lines 12 increases the motor 10 would normally have a tendency to increase its speed. The increase in voltage, however, causes the non-linear impedance element 15 to decrease its impedance so that the increase in excitation of the motor field winding 14 is more than proportional to the increase in voltage whereby the speed of the motor 10 is slowed down and returns to normal. By properly proportioning the non-linear impedance element 15 and the motor field windings 13 and 14 the speed of the motor 10, and consequently the frequency of the alternator 11, can be made to remain substantially constant over a relatively wide variation of voltage of the direct current supply source.

The action of the regulating means which controls the excitation of the alternating current generator 11 so as to maintain the voltage thereof substantially constant will now be described. As pointed out before, the alternator field winding 19 is differentially wound or is of opposite polarity with respect to the main alternator field winding 17 so that if the excitation of the winding 19 is increased the net flux supplied to the alternator 11 is decreased and similarly if the current supplied to the winding 19 is decreased the net flux supplied to the alternator 11 is increased. Since the field winding 19 is connected across the output terminals of the generator 11, it is evident that the net flux supplied to the generator will vary inversely with the output voltage thereacross. Hence, if the voltage of the generator increases above a predetermined value, the current supplied to the differential winding also increases whereby the net flux supplied to the generator decreases and the voltage tends to return to normal. Similarly, if the output voltage of the generator decreases below a given normal value, the current supplied to the differential winding 19 decreases causing an increase in the net flux supplied to the generator and its voltage tends to return to the normal value. The non-linear impedance element 21 acts to cause a disproportionate change in the current supplied to the differential winding 19 with changes in output voltage of the generator in the same manner in which the non-linear impedance element 15 causes a disproportionate change in the current flowing through the motor exciting winding 14 as described above. Therefore, the sensitivity and corrective action exerted by the generator differential field winding 19 is increased by the action of the non-linear impedance 21 and the regulating means is more sensitive in operation whereby the voltage of the alternator is kept more nearly constant. The action of the differential field 19, however, cannot of itself act to maintain the output voltage of the alternator constant with wide changes in load due to the fact that a departure of the alternator voltage from normal is necessary to bring about a change in the excitation or current flowing in the differential winding 19. Thus, for example, if the winding 19 is proportioned so that the generator voltage is normal for light loads, upon a large increase in load the voltage of the generator will tend to droop. Similarly, if the winding 19 is proportioned to give normal voltage at heavy load, at light loads the voltage of the generator will tend to rise. This voltage fluctuation may be termed the "load error."

The generator field winding 18 acts to compensate for what has been termed above "load error." Since the generator field winding 18 is connected in series with the armature of the drive motor 10, the current flowing therethrough, and hence the compensating action exerted thereby, is a function of the motor current and torque which is in turn a function of the load on the generator 12. Thus as the load on the generator increases and the output voltage thereof tends to droop due to "load error," the current flowing through the compensating winding 18 increases and thereby increases the total excitation of the generator whereby the output voltage is brought back to the normal value for the increased load condition. Similarly, if the load decreases so that the voltage of the generator tends to rise due to "load error" the current flowing through the compensating winding 18 decreases whereby the total excitation of the generator is decreased so that the generator voltage tends to return to the normal value for the decreased load condition. Thus, if we consider the differential field winding 19 as a regulator of the alternator output voltage, the compensating winding 18 acts, in effect, to change the setting of this regulator to compensate for voltage changes due to load. By properly proportioning the generator field windings 17, 18 and 19, the generator 11 can be made to hold substantially constant voltage under all load conditions. Changes in voltage of the generator 11 due to factors other than a change in load such as, for example, a change in temperature of the generator windings, are automatically compensated for by the action of the differential field winding 19.

Thus it will be seen that I have provided improved dynamo-electric apparatus for converting direct current to alternating current which will act to maintain the frequency and the voltage of the alternating current constant under a wide variety of conditions. Furthermore, the regulating means associated therewith is extremely simple and rugged in construction and requires very little attention or adjustment since it has no moving parts.

In Fig. 2 of the drawing I have shown a modification which is generally similar to that disclosed in Fig. 1 and corresponding parts have been given the same reference numerals. In this modification, however, the generator main field winding 17 is energized by means of an exciter 22 having a main field winding 23 and a differential field winding 24. The main exciter field winding 23 has been illustrated as a shunt field but it may equally well be a series field without departing from my invention. The differential field winding 24 acts in the same manner as the differential field winding 19 in the Fig. 1 arrangement except that the differential field winding 24 acts through the exciter 22 rather than directly on the main field 17 of the generator 11. Otherwise, the operation is the same as that described in connection with Fig. 1. This arrangement has the advantage that the same regulating action can be obtained with a smaller current flowing through the generator voltage responsive control circuit including the non-linear impedance element 21 and the rectifier 20 whereby the impedance element and the rectifier can be of smaller size without danger of overheating.

In the arrangements illustrated in Figs. 1 and 2 the differential field winding 19 and its associated energizing circuit may be omitted where less accurate control of generator voltage is required since the major factor tending to vary the generator output voltage is the load change which is compensated for by the action of the generator field winding 18.

While I have shown and described particular embodiments of my invention, it will occur to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, a direct-current motor, an alternating-current generator connected to be driven thereby, said motor having a field winding and said generator having two field windings, a variable-voltage direct-current circuit for energizing said motor, one of the field windings of said generator being serially connected in said circuit, a negative impedance current characteristic element serially connected with the field winding of said motor across said circuit, a rectifier for connecting the remaining field winding of said generator across the output terminals thereof, the polarity of the field windings of said generator being in opposition, and a negative impedance current characteristic impedance element serially connected with said rectifier.

2. In combination, a direct current motor, a generator connected to be driven thereby, a direct current circuit for energizing said motor, means for providing a field flux for said generator, means for varying said field flux in accordance with the load current drawn by said motor from said circuit, and means for varying said field flux inversely and non-linearly with the output voltage across the terminals of said generator.

3. In combination, a direct current motor, a generator connected to be driven thereby, a direct current circuit for energizing said motor, means for providing a field flux for said generator, means for varying said field flux in accordance with the load current drawn by said motor from said circuit, and means for varying said field flux inversely with the output voltage across the terminals of said generator.

4. In combination, a direct current motor, an alternating current generator connected to be driven thereby, said generator having two field windings, a direct current circuit for energizing said motor, one of said field windings being connected to be energized in accordance with the current in said circuit, means for energizing the other of said field windings, and means for varying the energization of said last mentioned field winding inversely and non-linearly with the voltage across the output terminals of said generator.

5. In combination, a direct current motor, an alternating current generator connected to be driven thereby, a motor field winding, a generator field winding, a variable voltage source of direct current connected to said motor, an energizing circuit for said motor field winding connected across said source, a negative impedance-current characteristic impedance connected in series with said circuit, an energizing circuit for said generator field winding connected across the output terminals of said generator, said last mentioned energizing circuit including a rectifier and a negative impedance-current characteristic impedance.

6. In combination, a direct current motor, an alternating current generator connected to be driven thereby, said generator having two field windings, a direct current circuit for energizing said motor, one of said field windings being connected to be energized in accordance with the current in said circuit, an energizing circuit for the other of said field windings connected to be energized in accordance with the voltage across output terminals of said generator, the polarity of the field windings of said generator being in opposition, said energizing circuit including a rectifier and a negative impedance-current characteristic impedance.

7. In combination, a direct current motor, a generator connected to be driven thereby, said generator having two field windings, a direct current circuit for energizing said motor, the first of said field windings being connected to be energized in accordance with the current in said circuit, an energizing circuit for the other of said field windings connected to be energized in accordance with the voltage across the output terminals of said generator, said circuit including a negative impedance-current characteristic impedance.

8. In combination, an alternating current generator, a field winding for said generator, an energizing circuit for said field winding connected to be energized in accordance with the voltage across the output terminals of said generator, said energizing circuit including a rectifier and a negative impedance-current characteristic impedance.

9. In combination, an alternating current generator, a field winding for said generator, an exciter connected to energize said field winding, said exciter having a first self-excited field winding and a second field winding arranged to produce a field flux in opposition to that produced by said first exciter field winding, an energizing circuit for said second exciter field winding connected to be energized in accordance with the voltage across the output terminals of said generator, said energizing circuit including a rectifier and a negative impedance-current characteristic impedance.

ALEC FISHER.